US012071787B2

(12) United States Patent
Liao

(10) Patent No.: US 12,071,787 B2
(45) Date of Patent: Aug. 27, 2024

(54) ELECTRIC UNLOCKING DEVICE FOR A PUSH BAR LATCH

(71) Applicant: Yi Fan Liao, Taoyuan (TW)

(72) Inventor: Yi Fan Liao, Taoyuan (TW)

( * ) Notice: Subject to any disclaimer, the term of this patent is extended or adjusted under 35 U.S.C. 154(b) by 129 days.

(21) Appl. No.: 17/893,397

(22) Filed: Aug. 23, 2022

(65) Prior Publication Data

US 2023/0407675 A1 Dec. 21, 2023

(30) Foreign Application Priority Data

Jun. 15, 2022 (TW) ................................ 111206313

(51) Int. Cl.
*E05B 47/00* (2006.01)
*E05B 65/10* (2006.01)

(52) U.S. Cl.
CPC ...... *E05B 47/0001* (2013.01); *E05B 65/1053* (2013.01); *E05B 2047/0016* (2013.01); *E05B 2047/0037* (2013.01); *E05B 2047/0073* (2013.01)

(58) Field of Classification Search
CPC ............. E05B 47/0001; E05B 65/1053; E05B 2047/0016; E05B 2047/0037; E05B 2047/0073
See application file for complete search history.

(56) References Cited

U.S. PATENT DOCUMENTS

| | | | | |
|---|---|---|---|---|
| 8,528,946 | B2 * | 9/2013 | Shen | E05B 65/1053 70/92 |
| 9,580,944 | B2 * | 2/2017 | Arlinghaus | E05B 53/005 |
| 10,968,664 | B2 * | 4/2021 | Arlinghaus | E05B 41/00 |
| 2010/0045053 | A1 * | 2/2010 | Dye | E05B 65/1053 292/201 |
| 2011/0047874 | A1 * | 3/2011 | Lowder | E05B 65/1053 49/31 |
| 2014/0109479 | A1 * | 4/2014 | Morstatt | E05B 65/1093 292/144 |
| 2019/0048618 | A1 * | 2/2019 | Mckibben | E05B 17/0045 |
| 2019/0360235 | A1 * | 11/2019 | Quinn | E05B 9/08 |
| 2019/0376331 | A1 * | 12/2019 | McKibben | E05F 1/1261 |
| 2020/0248484 | A1 * | 8/2020 | Arlinghaus | E05B 47/0012 |
| 2021/0040775 | A1 * | 2/2021 | Kusanale | G07C 9/00571 |
| 2021/0148141 | A1 * | 5/2021 | Yalamati | E05B 17/0041 |
| 2021/0164267 | A1 * | 6/2021 | Holtgrewe | E05B 65/1046 |

* cited by examiner

*Primary Examiner* — Mark A Williams
(74) *Attorney, Agent, or Firm* — Rosenberg, Klein & Lee

(57) ABSTRACT

A electric unlocking device for a push bar latch, comprising: a base frame having an external sliding slot; a linear motor having a stepping stud, the stepping stud is equipped with a stud return spring, and the stepping stud has a binding rod; an unlocking unit having a pair of side plate and an end plate, the side plate has a pair of internal sliding slot, and the end plate has a non-circular hole; a binding unit having a limit oval head rivet and a non-circular barrel, the non-circular barrel sets through the non-circular hole and makes the limit oval head rivet arranged inside the unlocking unit, and makes the non-circular barrel combine with the binding rod, sleeves a buffer spring on the non-circular barrel; and an unlocking connecting rod, the outer end is combined with the push bar returning unit, and the inner end is provided with an unlocking pin.

5 Claims, 10 Drawing Sheets

ELECTRIC UNLOCKING DEVICE FOR A PUSH BAR LATCH

BACKGROUND OF THE INVENTION

1. Field of the Invention

The invention relates to an electric unlocking device for a push bar latch, especially the one who has an electric unlocking function.

2. Description of the Related Art

As showing in FIG. 1, the push bar latch 10 can be unlocked by pushing the push rod 11 to go out, and the setting range of the push rod 11 is very large, so that the push bar latch 10 is very convenient for unlocking and is often used in exit doors; however, since the push bar latch 10 has the characteristics of being very convenient to unlock and automatically return, but for the disabled such as riding in a wheelchair, it may still be difficult for pushing the push rod 11 to unlock and go out, so the push bar latch 10 is increased with the electric unlocking function not only facilitates easy access for the disabled, but also has enter control functions.

SUMMARY OF THE INVENTION

It is a primary objective of the present invention to provide an electric unlocking device for a push bar latch, especially the one who has the electric unlocking function of a push bar latch.

It is another objective of the present invention to have the effect of power saving during electric unlocking and protecting the linear motor.

In order to achieve the above objectives, the present invention comprise: a base frame having an external sliding slot; a linear motor having a stepping stud installed on the base frame, the stepping stud extends and retracts relative to the external sliding slot and is equipped with a stud return spring, and the head end of the stepping stud has a binding rod; an unlocking unit having a pair of side plate and an end plate arranged in the base frame, the pair of side plate has a pair of internal sliding slot relative to the external sliding slot, and the end plate has a non-circular hole; a binding unit having a limit oval head rivet and a non-circular barrel, the non-circular barrel sets through the non-circular hole and makes the limit oval head rivet arranged inside the unlocking unit, and makes the non-circular barrel combine with the binding rod, sleeves a buffer spring on the non-circular barrel; and an unlocking connecting rod, the outer end of the unlocking connecting rod is combined with the push bar returning unit, and the inner end is provided with an unlocking pin, the unlocking pin sets through the pair of external sliding slot and the pair of internal sliding slot.

Moreover, the linear motor including a control unit, when the control unit sets the number of unlocking step, it firstly makes the stepping stud continue to travel at a slow speed until the stepping stud has out-of-step phenomenon, and sets the running step of the stepping stud as maximum step when the out-of-step phenomenon occurs, and the unlocking step of the stepping stud is set to be lower than the maximum step and memorized, and then the stepping stud is unlocked according to the unlocking step; wherein the unlocking step is 95%±3% of maximum step; wherein the buffer spring is located between the outer end surface of the end plate and the head end surface of the stepping stud, and the screw return spring is sleeved on the tail section of the stepping stud and positioned by a positioning stud; wherein the buffer spring is located between the inner end surface of the end plate and the limit oval head rivet, and the stud return spring is sleeved on the head section of the stepping stud and located between the outer surface of the end plate and the inner end surface of the linear motor.

DETAILED DESCRIPTION OF THE PREFERRED EMBODIMENT

Figure 1:
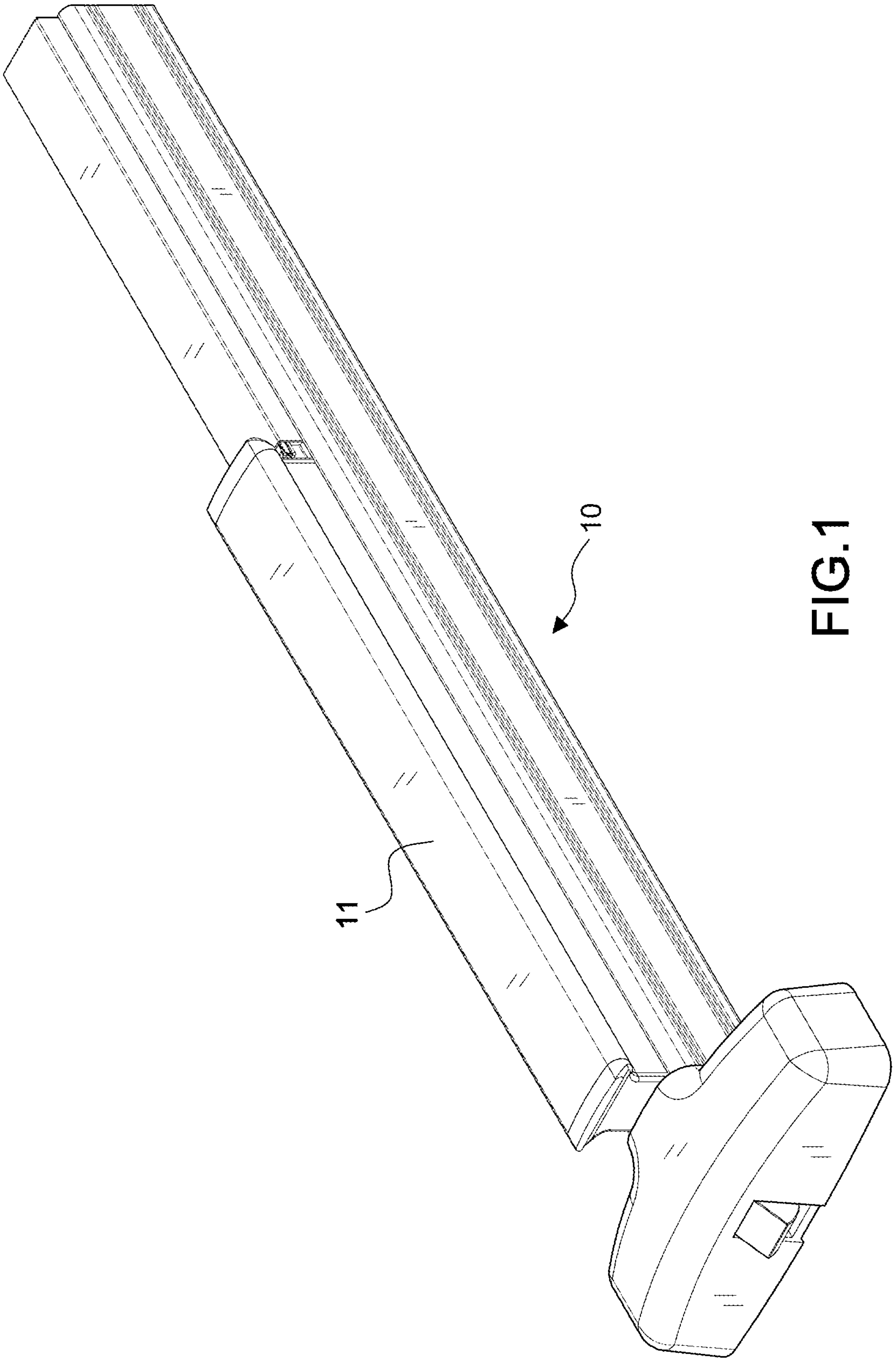
FIG. 1 is a schematic diagram illustrating structure of the push bar latch.
Figure 2:
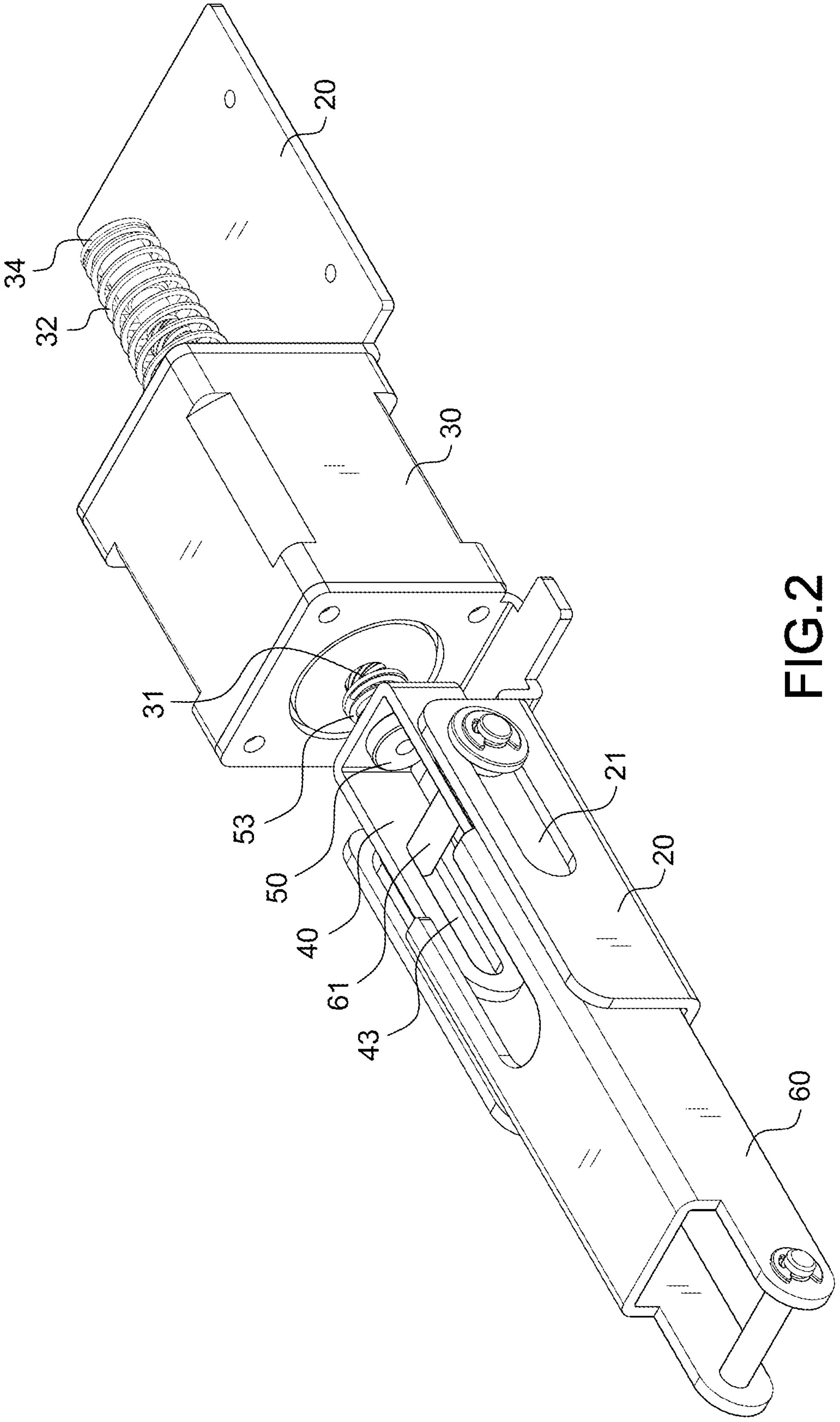
FIG. 2 is a perspective views of the first embodiment of the present invention.
Figure 3:
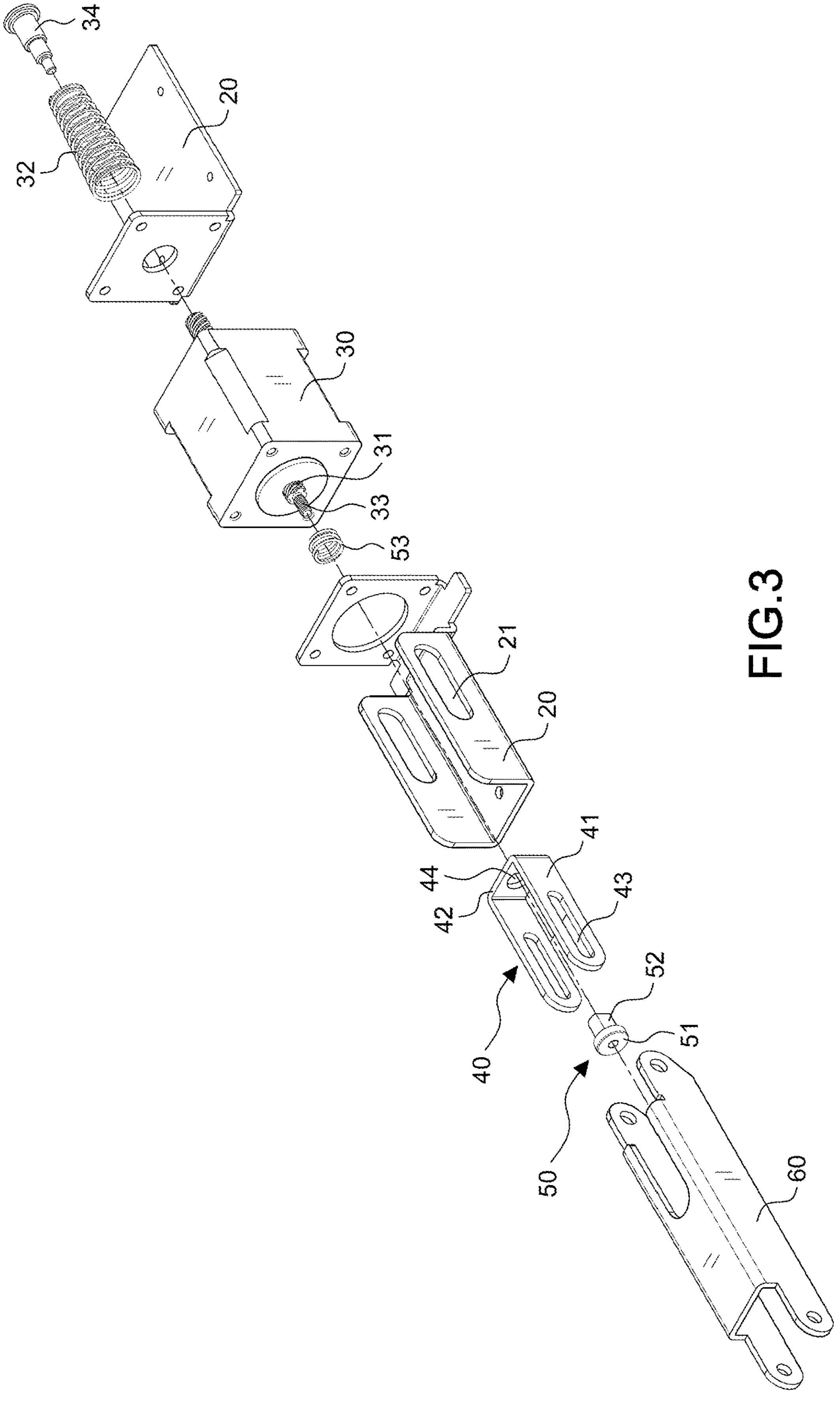
FIG. 3 is an exploded views of the first embodiment of the present invention.
Figure 4:
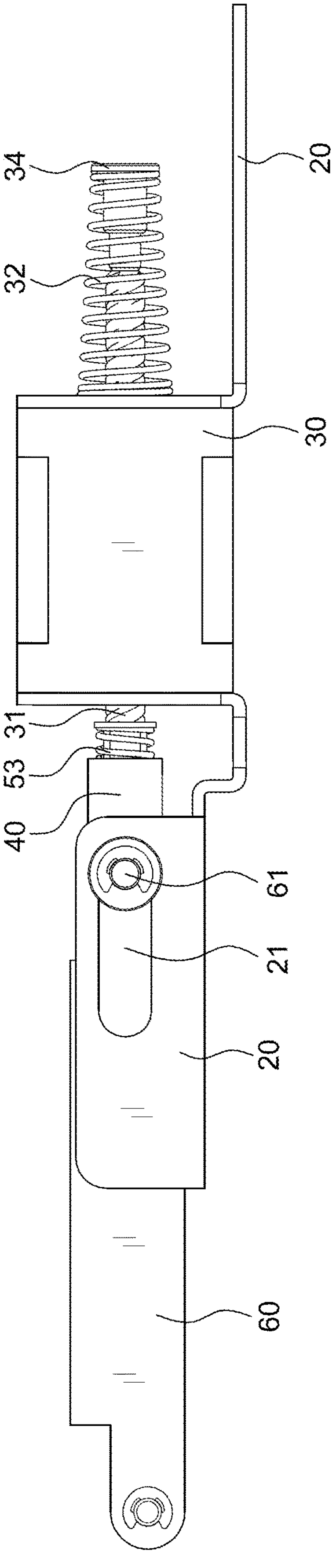
FIG. 4 is a front views of the first embodiment of the present invention in locking status.
Figure 5:
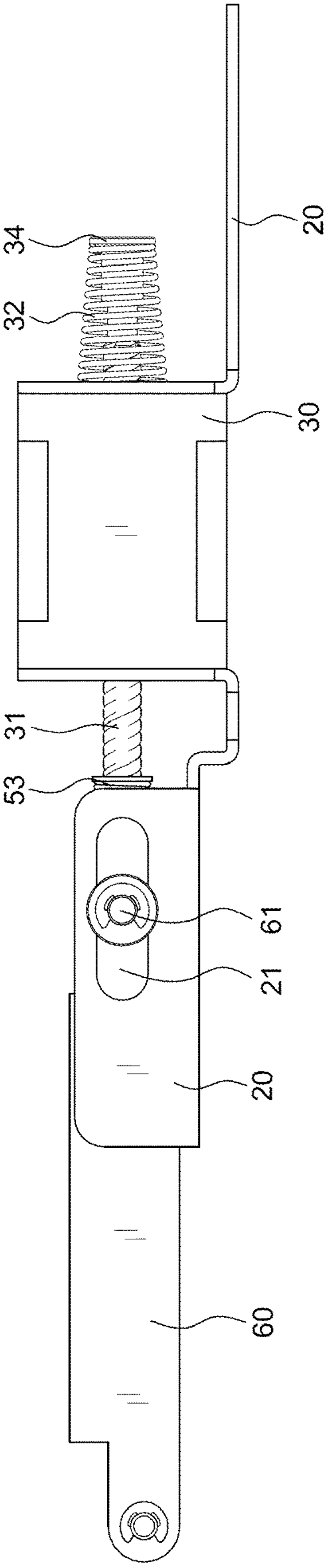
FIG. 5 is a front views of the first embodiment of the present invention in unlocking status.
Figure 6:
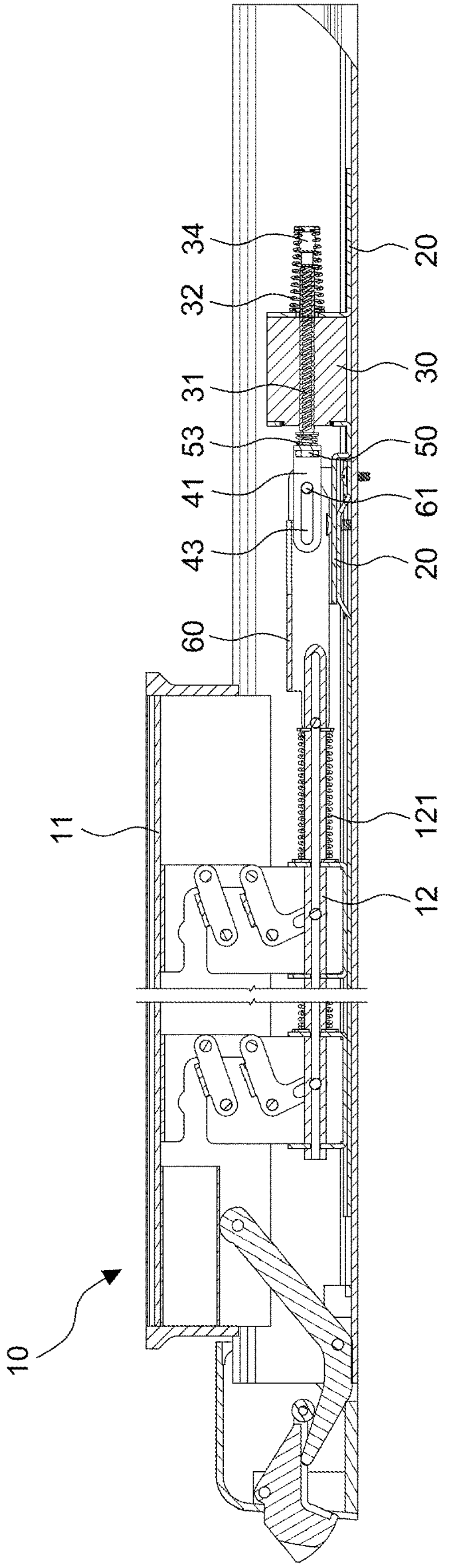
FIG. 6 is a sectional views of the first embodiment of the present invention combined with the push bar latch in locking status.
Figure 7:
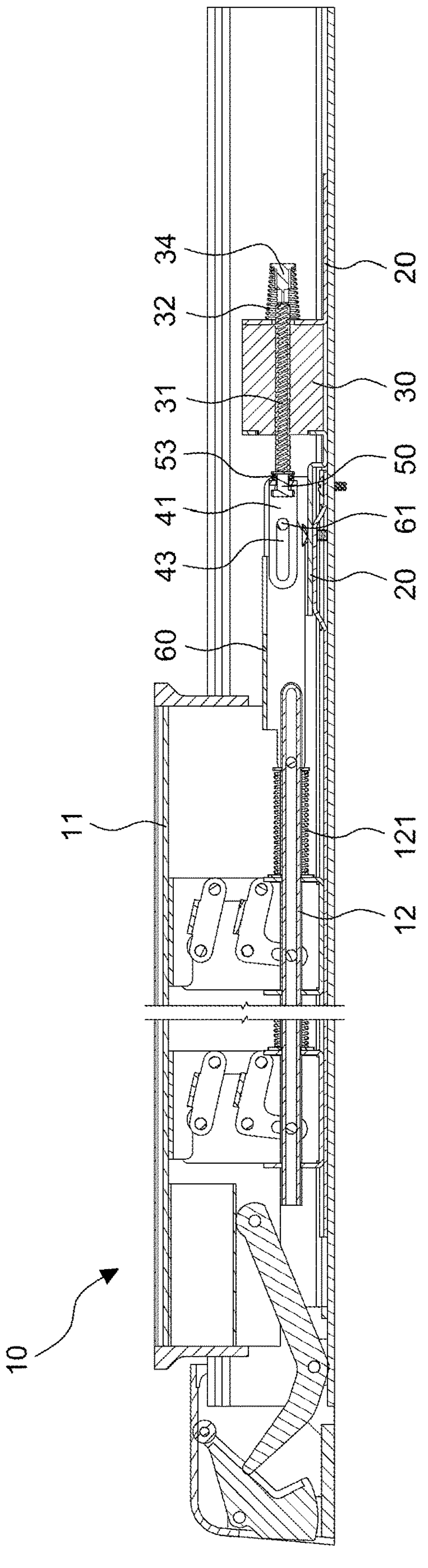
FIG. 7 is a sectional views of the first embodiment of the present invention combined with the push bar latch in unlocking status.

Referring to FIGS. 2-7, the first embodiment of the present invention, including: a base frame 20 having an external sliding slot 21; a linear motor 30 having a stepping stud 31 installed on the base frame 20, the stepping stud 31 extends and retracts relative to the external sliding slot 21 and is equipped with a stud return spring 32, and the head end of the stepping stud 31 has a binding rod 33, the stud return spring 32 is sleeved at the tail section of the stepping stud 31 and fixed by a positioning post 34, the positioning post 34 is combined with the tail end of the stepping stud 31; an unlocking unit 40 having a pair of side plate 41 and an end plate 42 arranged in the base frame 20, the pair of side plate 41 has a pair of internal sliding slot 43 relative to the external sliding slot 21, and the end plate 42 has a non-circular hole 44; a binding unit 50 having a limit oval head rivet 51 and a non-circular barrel 52, the non-circular barrel 52 sets through the non-circular hole 44 and makes the limit oval head rivet 51 arranged inside the unlocking unit 40, and makes the non-circular barrel 52 combine with the binding rod 33, sleeves a buffer spring 53 on the non-circular barrel 52; and an unlocking connecting rod 60, the outer end of the unlocking connecting rod 60 is combined with a push bar returning unit 12, and the inner end is provided with an unlocking pin 61, the unlocking pin 61 sets through the pair of external sliding slot 21 and the pair of internal sliding slot 43.

Whereby the first embodiment of the present invention is a forward push-to-unlock type with the push bar returning unit 12, when the linear motor 30 is energized to make the stepping stud 31 move forward, uses the buffer spring 53 as a buffer, the unlocking unit 40 pushes the unlocking connecting rod 60 through the unlocking pin 61 and moves forward together in the external sliding slot 21, and the unlocking connecting rod 60 can link the push bar returning unit 12 to make the push bar latch 10 electrically unlock; when the linear motor 30 is powered off, the stepping stud 31 uses the stud return spring 32 to return to its original position; in addition, when the push rod 11 is pushed horizontally to unlock manually, the push bar returning unit 12 will link the unlocking connecting rod 60 to move forward, however, because the unlocking pin 61 can move forward in the pair of internal sliding slot 43, the unlocking connecting rod 60 will not link the unlocking unit 40, and will not affect the manual unlocking action of the push bar latch 10, the push bar returning unit 12 is equipped with a compression spring 121 to make the push bar latch 10 automatically return to the locked state.

Figure 8:
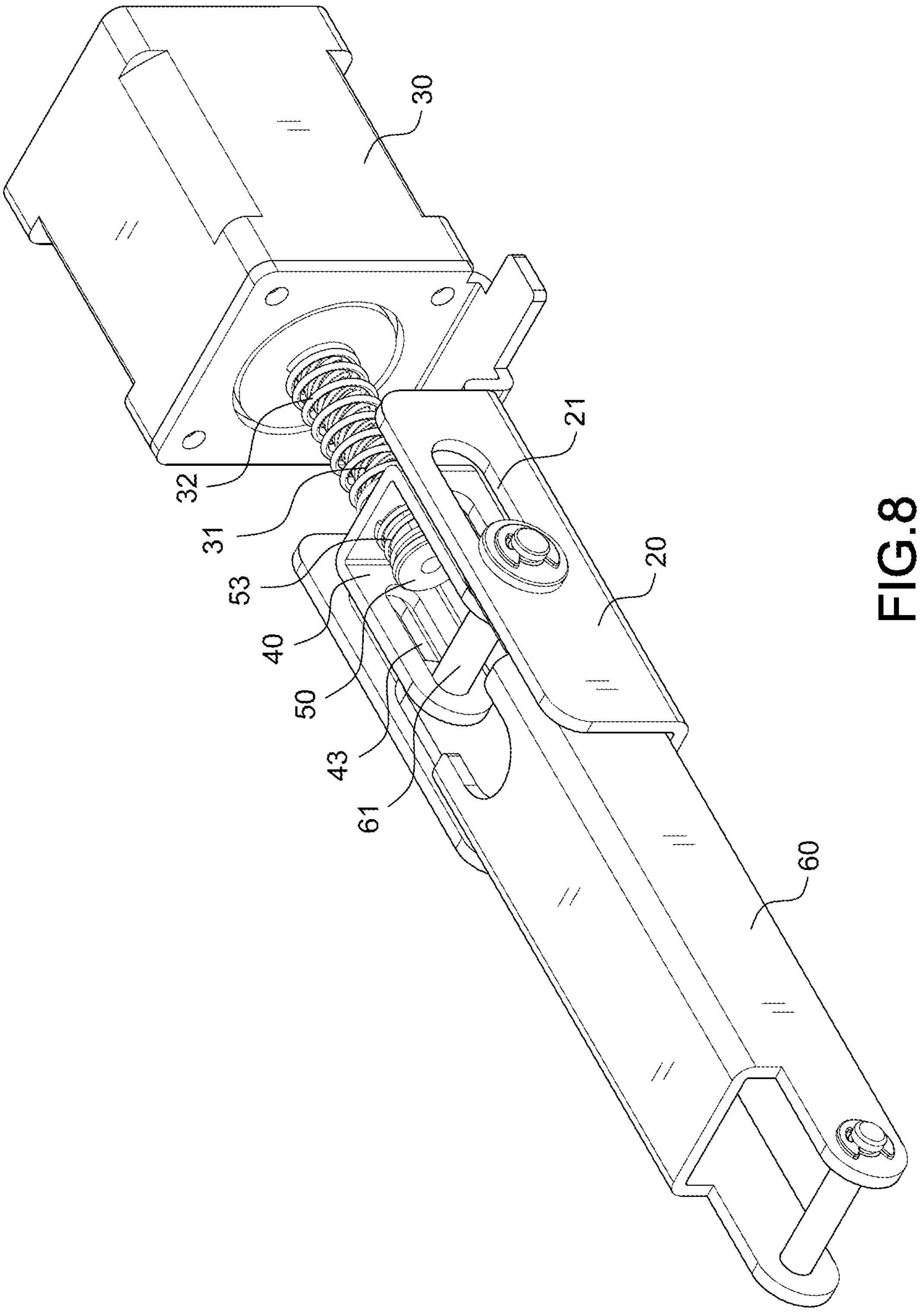
FIG. 8 is a perspective views of the second embodiment of the present invention.
Figure 9:
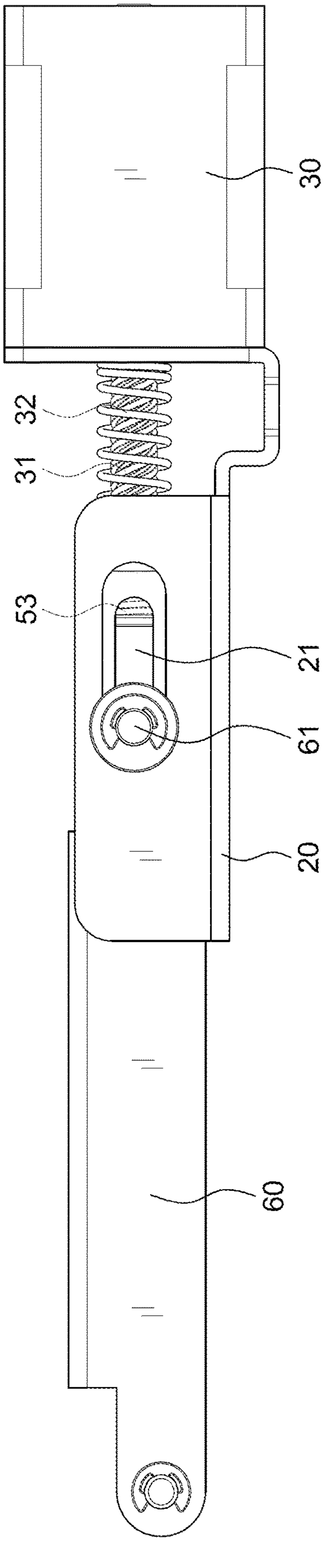
FIG. 9 is a front views of the second embodiment of the present invention in locking status.
Figure 10:
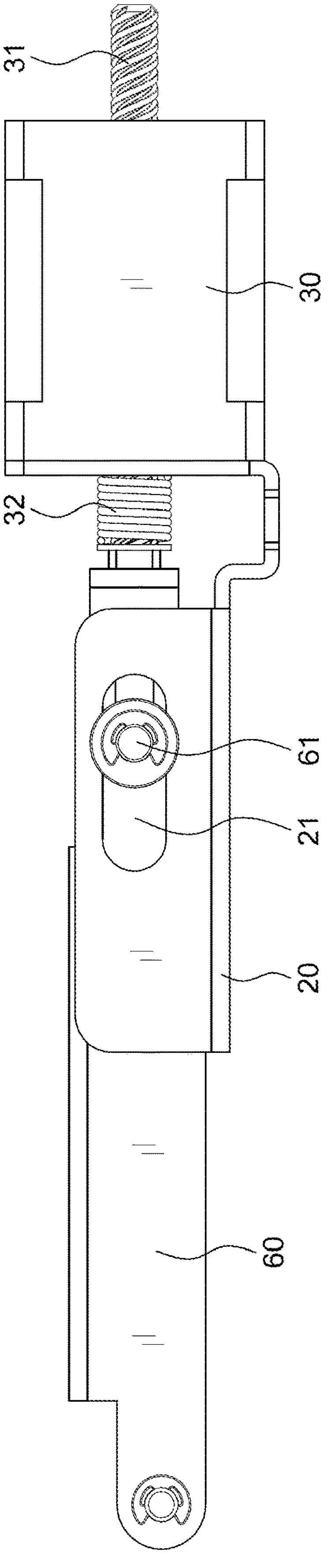
FIG. 10 is a front views of the second embodiment of the present invention in unlocking status.

Referring to FIGS. 8-10, the second embodiment of the present invention, including: a base frame 20 having an external sliding slot 21; a linear motor 30 having a stepping stud 31 installed on the base frame 20, the stepping stud 31 extends and retracts relative to the external sliding slot 21 and is equipped with a stud return spring 32, and the head end of the stepping stud 31 has a binding rod 33, the stud return spring 32 is sleeved at the tail section of the stepping stud 31 and fixed by a positioning post 34, the positioning post 34 is combined with the tail end of the stepping stud 31; an unlocking unit 40 having a pair of side plate 41 and an end plate 42 arranged in the base frame 20, the pair of side plate 41 has a pair of internal sliding slot 43 relative to the external sliding slot 21, and the end plate 42 has a non-circular hole 44; a binding unit 50 having a limit oval head rivet 51 and a non-circular barrel 52, the non-circular barrel 52 sets through the non-circular hole 44 and makes the limit oval head rivet 51 arranged inside the unlocking unit 40, and makes the non-circular barrel 52 combine with the binding rod 33, sleeves a buffer spring 53 on the non-circular barrel 52, the buffer spring 53 is located between the inner end surface of the end plate 42 and the limit oval head rivet 51; and an unlocking connecting rod 60, the outer end of the unlocking connecting rod 60 is combined with a lasso returning unit of the push bar latch 10, and the inner end is provided with an unlocking pin 61, the unlocking pin 61 sets through the pair of external sliding slot 21 and the pair of internal sliding slot 43. The difference between the second embodiment of the present invention and the first embodiment is that the stud return spring 32 and the buffer spring 53 are arranged at different positions.

The second embodiment of the present invention is a rear-pull-unlock type with a lasso returning unit, the linear motor 30 uses the buffer spring 53 to provide a buffer during the stroke of the stepping stud 31 when the power is turned on, and the unlocking unit 40 pulls the unlocking connecting rod 60 through the unlocking pin 61 and move backward in together with the external sliding slot 21, and the unlocking connecting link 60 can then be linked with the lasso returning unit (not showing in drawing) to electrically unlock the push bar latch 10; When the linear motor 30 is powered off, the stepping stud 31 uses the stud return spring 32 to return to its original position; in addition, when the push rod 11 is unlocked manually, the lasso returning unit will link the unlocking connecting link 60 to move backward, because the unlocking pin 61 can move backward in the pair of internal sliding slot 43, the unlocking connecting link 60 will not link the unlocking unit 40, and will not affect the manual unlocking action of the push bar latch 10, the lasso returning unit is equipped with a torsion spring (not showing in drawing), which can make the push bar latch 10 automatically return to the locked state.

The linear motor 30 also has a control unit (not showing in drawing), which can be used for the initial setting of the unlocking steps in the initial installation of the push bar latch (in order to meet the needs of the market, the electric unlocking device can be easily installed on various brands, because the strokes of the push bar latch of various manufacturers and brands are different, so the number of steps required to unlock will be different), or reset the number of steps to unlock due to abnormal unlocking; the setting method is first making the stepping stud 31 continue to travel at a slow speed until the stepping stud 31 has out-of-step phenomenon (at this time, it is completely unlocked state, so that the stepping stud 31 is subject to great resistance), and sets the running step of the stepping stud 31 as maximum step when the out-of-step phenomenon occurs, and the unlocking step of the stepping stud 31 is set to be lower than the maximum step and memorized, and then the stepping stud 31 is unlocked according to the unlocking step, since there is a buffer spring 53, the number of unlocking steps can be made more flexible; wherein the unlocking step is 95%±3% of maximum step, the initial/resetting of the number of unlocking steps can be performed manually or automatically.

With the feature disclosed above, the present invention is combined with the push bar latch and uses the stepping stud 31 of the linear motor 30 to push/pull the unlocking unit 40, and then moves the push bar returning member 12 through the unlocking connecting rod 60, so that the push bar latch can be electrically unlocked, and has effect of having the electric unlocking function of the door lock; wherein, in the stroke of the stepping stud 31 pushing/pulling the unlocking member 40, the buffer spring 53 provides a buffering effect, allowing the linear motor 30 to operate in a state of low resistance, and the electric unlocking operation is smooth, power-saving and having the function of protecting linear motor. However, in addition to the push bar type and lasso returning type, the returning unit of the push bar latch is also designed with a rotary type, it can also achieve the purpose of electric unlocking through the unlocking connecting rod of different structures.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An electric unlocking device for a push bar latch having a slidably displaceable push rod, the electric unlocking device comprising:

a base frame having a pair of external sliding slots formed therein;

an unlocking unit disposed in the base frame and having a pair of side plates and an end plate extending between the pair of side plates and having a non-circular hole formed therethrough, each of the pair of side plates having an internal sliding slot formed therein and disposed in correspondence with a corresponding one of the pair of external sliding slots of the base frame;

a linear motor affixed to the base frame, the linear motor having a displaceable stepping stud having a binding rod on an end thereof coupled to the unlocking unit, the stepping stud extending and retracting relative to the external sliding slot, the stepping stud having a stud return spring sleeved on a portion thereof;

a binding unit having a limit oval head rivet and a non-circular barrel extending from the limit head rivet, the non-circular barrel passes through the non-circular hole of the end plate with the limit oval head rivet disposed on an inner side of the unlocking unit, the non-circular barrel being coupled to the binding rod, the non-circular barrel having a buffer spring sleeved thereon; and an unlocking connecting rod having an outer end coupled to a push bar returning unit, the unlocking connecting rod having an inner end being slidably coupled to the base frame by an unlocking pin, the unlocking pin passing through the pair of external sliding slot and the pair of internal sliding slot and being slidably displaceable therein, wherein energizing the linear motor displaces the locking unit and the unlocking connecting rod therewith to displace the push rod of the push bar latch by the push bar returning unit responsive to displacement of the unlocking connecting rod to unlock the push bar latch.

2. The electric unlocking device as claimed in claim 1, wherein the linear motor includes a control unit, responsive to the control unit setting a number of unlocking steps, the control unit first controls the linear motor to first displace the stepping stud to travel at a slow speed until the stepping stud experiences an out-of-step phenomenon, responsive to the stepping stud experiencing the out-of-step phenomenon, the control unit controls the linear motor to set the running step of the stepping stud to a maximum step, and the control unit controls the linear motor to set an unlocking step of the stepping stud to be a step lower than the maximum step and stored, and subsequently the stepping stud is displaced for unlocking according to the unlocking step.

3. The electric unlocking device as claimed in claim 2, the unlocking step is 95%±3% of maximum step.

4. The electric unlocking device as claimed in claim 1, wherein the buffer spring is located between an outer end surface of the end plate of the unlocking unit and a head end surface of the stepping stud, and the stud return spring is sleeved on a tail section of the stepping stud and secured thereon by a positioning stud.

5. The electric unlocking device as claimed in claim 1, wherein the buffer spring is located between an inner end surface of the end plate of the unlocking unit and the limit oval head rivet, and the stud return spring is sleeved on a head section of the stepping stud and located between an outer surface of the end plate of the unlocking unit and an inner end surface of the linear motor.

* * * * *